(12) United States Patent
Sinha et al.

(10) Patent No.: US 9,251,217 B2
(45) Date of Patent: Feb. 2, 2016

(54) SEARCHING FOR INFORMATION WITHIN SOCIAL NETWORKS

(71) Applicant: LinkedIn Corporation, Mountain View, CA (US)

(72) Inventors: Shakti Dhirendraji Sinha, Sunnyvale, CA (US); Abhimanyu Lad, San Mateo, CA (US); Ramesh Dommeti, San Jose, CA (US); Bradley Scott Mauney, Mountain View, CA (US); Ashley Woodman Hall, Menlo Park, CA (US); Scott Blackburn, Los Altos, CA (US)

(73) Assignee: LinkedIn Corporation, Mountain View, CA (US)

( * ) Notice: Subject to any disclaimer, the term of this patent is extended or adjusted under 35 U.S.C. 154(b) by 178 days.

(21) Appl. No.: 13/755,919

(22) Filed: Jan. 31, 2013

(65) Prior Publication Data

US 2014/0214822 A1   Jul. 31, 2014

(51) Int. Cl.
*G06F 17/30* (2006.01)
*G06Q 30/02* (2012.01)
*G06Q 50/00* (2012.01)

(52) U.S. Cl.
CPC ........ *G06F 17/3053* (2013.01); *G06F 17/3064* (2013.01); *G06F 17/3071* (2013.01); *G06F 17/30705* (2013.01); *G06F 17/30867* (2013.01); *G06Q 30/0201* (2013.01); *G06Q 30/0204* (2013.01); *G06Q 50/01* (2013.01)

(58) Field of Classification Search
CPC .......... G06F 17/3005; G06F 17/30112; G06F 17/30126; G06F 17/30554; G06F 17/30696; G06F 17/30941; G06F 17/30991

USPC .......... 707/722, 723, 729, 731, 758
See application file for complete search history.

(56) References Cited

U.S. PATENT DOCUMENTS

| | | | |
|---|---|---|---|
| 2006/0212466 A1* | 9/2006 | Hyder et al. .................. 707/101 |
| 2007/0061303 A1* | 3/2007 | Ramer et al. ...................... 707/3 |
| 2010/0121842 A1* | 5/2010 | Klinkott ....................... 707/722 |
| 2011/0179021 A1* | 7/2011 | Wen et al. .................... 707/723 |
| 2011/0264648 A1* | 10/2011 | Gulik et al. .................. 707/722 |
| 2011/0276480 A1* | 11/2011 | Tunguz-Zawislak et al. .. 705/40 |
| 2012/0265746 A1* | 10/2012 | Srivastava et al. ........... 707/706 |
| 2012/0310929 A1* | 12/2012 | Patterson et al. ............. 707/728 |
| 2013/0179420 A1 | 7/2013 | Park et al. |
| 2014/0214815 A1 | 7/2014 | Sinha et al. |

OTHER PUBLICATIONS

"U.S. Appl. No. 13/756,180, Non Final Office Action mailed Sep. 25, 2014", 16 pgs.
"U.S. Appl. No. 13/756,180, Final Office Action mailed Apr. 20, 2015", 15 pgs.
"U.S. Appl. No. 13/756,180, Response filed Feb. 25, 2015 to Non Final Office Action mailed Sep. 25, 2014", 14 pgs.

* cited by examiner

*Primary Examiner* — Hares Jami
(74) *Attorney, Agent, or Firm* — Schwegman Lundberg & Woessner, P.A.

(57) ABSTRACT

Systems and methods for searching for information within social networks are described. In some examples embodiments, a search assist system receives a query, such as a partial query, identifies two or more categories of data that include information satisfying the query, ranks the identified categories of data based on various selection criteria, and presents suggested search terms based on the rankings.

20 Claims, 9 Drawing Sheets

SEARCHING FOR INFORMATION WITHIN SOCIAL NETWORKS

TECHNICAL FIELD

The present disclosure generally relates to information retrieval and display. More specifically, the present disclosure relates to methods, systems and computer program products for searching for information within social networks.

BACKGROUND

For many people, the point of entry to the Internet and other networks is a search engine. A search engine enables users to search for content of interest to them, and quickly navigate to web pages and other networked locations that provide the content. For example, a typical search engine (Google, Bing, and so on), receives query terms from a user, queries an index to identify content that satisfies the received query, and presents the identified content to the user as a result or results of the search. The user selects one or more of the presented results, and is taken to selected content.

Members of social networks often navigate within the pages and content of the social networks via other mechanisms. For example, they may view and select posts within a timeline of a social network, they may peruse a list of friends or other connections, and so on. However, a member of a social network often does not utilize available search tools within the social network in order to identify interesting content, among other things.

DESCRIPTION OF THE DRAWINGS

Some embodiments of the technology are illustrated by way of example and not limitation in the figures of the accompanying drawings.

DETAILED DESCRIPTION

Overview

The present disclosure describes methods, systems, and computer program products, which individually provide functionality for searching for information within social networks and/or displaying the results of searches for information within social networks.

In some example embodiments, a search assist system receives a query, such as a partial query, identifies two or more categories of data that include information satisfying the query, ranks the identified categories of data based on various selection criteria, and presents suggested search terms based on the rankings.

For example, the search assist system may receive a search query from a member of a social network via a search field provided by the social network, such as a string of characters of S-O-F-T. The system identifies three categories of data that include information satisfying the received partial query: (1) a "people" category that includes member names starting with "soft," (2) a "company" category that includes company names that include the word "soft," and (3) a "job listing" category that includes job listings having words that include "soft." The system ranks the categories based on attributes associated with the member, such as attributes that identify the member as being a job seeker (e.g., activity attributes indicating the member has recently viewer job listings, profile information identifying the member as being in a current position for a certain period of time, and so on). Based on the ranking, the system presents search query suggestions based on the rankings, including completing the search query with the term "software jobs," and presenting other suggestions proximate to the search field that identify other job listings and companies seeking candidates for software jobs, among other things.

In some example embodiments, a search assist system receives a search request from a member of a social network, identifies two or more categories of data that include information satisfying the search request, ranks the identified categories of data based on attributes associated with the member, and presents results of the search based on the rankings.

For example, the search assist system may receive a search request to search for content that includes the query string of "what skills should a CEO have." The system identifies two categories of data that include content satisfying the request: (1) a "jobs" category that includes job listings having CEO experience requirements, and (2) a "posts" category that includes informational posts written by members of the social network that are CEOs. The system determines the member has been updating his profile with various skills information, and ranks the "posts" category higher. Based on the ranking, the system presents various results of the search associated with the "posts" category in certain locations on a results page, such as higher up on the page, in highlighted sections, and so on.

In the following description, for purposes of explanation, numerous specific details are set forth in order to provide a thorough understanding of the various aspects of different embodiments of the present technology. It will be evident, however, to one skilled in the art, that the present technology may be practiced without all of the specific details.

Other advantages and aspects of the inventive subject matter will be readily apparent from the description of the figures that follows.

Suitable System

Figure 1:
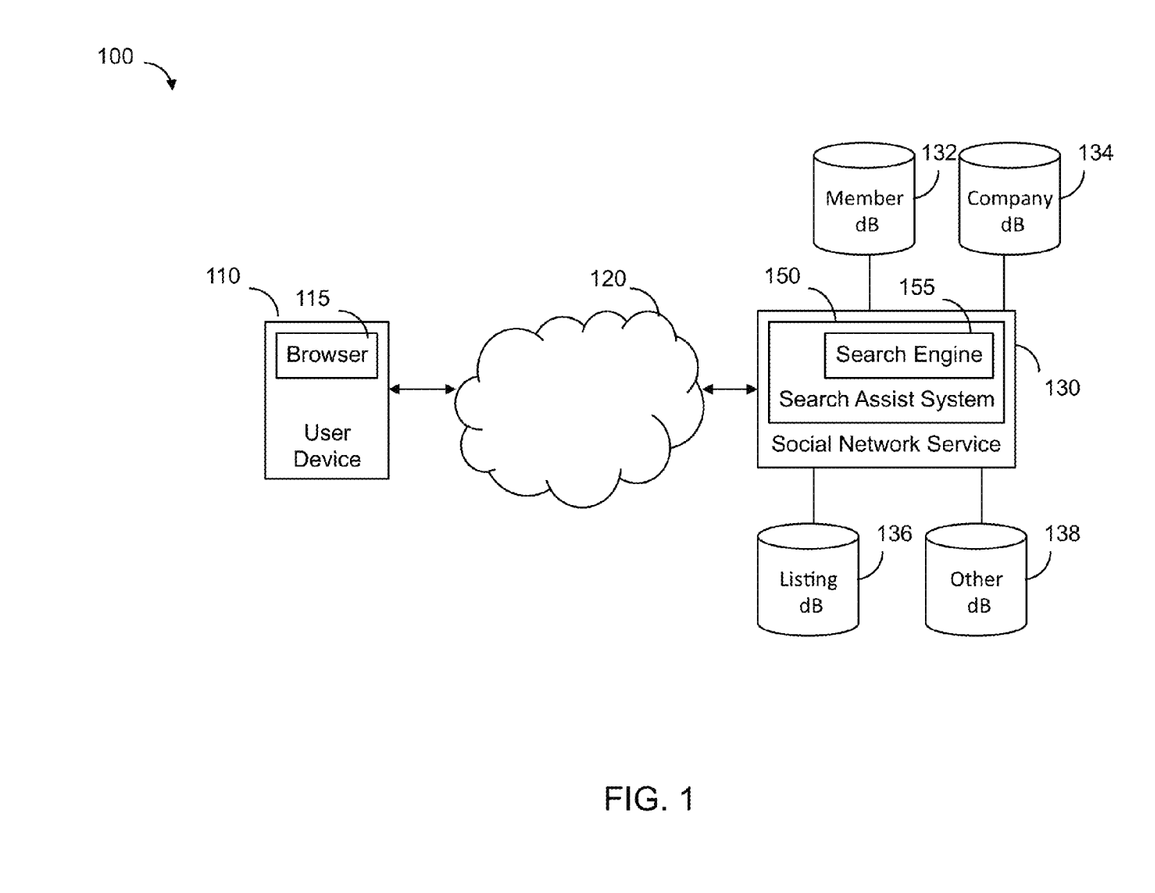
FIG. 1 is a block diagram illustrating an example of a network environment including a server operating a search assist system, consistent with some embodiments.

FIG. 1 is a block diagram illustrating an example of a network environment 100 including a server operating a search assist system, consistent with some embodiments.

The network environment 100 includes a user device 110 that includes a browser 115 or other application configured to access a social network service 130 that supports a social network over a network 120. The user device 110 may be any suitable computing device, such as a smart phone, a tablet, a laptop, gaming device, and/or any mobile device or computing device associated with a user, such as a member of the social network, capable of receiving input from a user and initiating search queries of data stored by the social network service 130. Furthermore, the user device 110 may be capable of displaying information, such as search results based on information that satisfies queries of information stored by the social network service 130.

One or more portions of the network 120 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, any other type of network, or a combination of two or more such networks.

The social network service 130 may store or access databases that include various categories of data or information, such as a member database 132 that contains member information (e.g., member profile information, social graph information, member activity information, and so on), a company database 134 that includes company or entity information (e.g., company profile information), a listing database 136 that includes job listing or other listing information (e.g., job listings, event listings, activity listings, and so on), and other databases 138 that include various other types of information, such as information associated with information posts published within the social network, information associated with media stored by the social network, and so on.

A social networking site is a useful location in which to store, search for, retrieve, and/or obtain various types of information. Often, a social network or other similar site, such as LinkedIn, Facebook, Google+, Twitter, and so on, stores various types of information associated with members of the site, activities performed within the site, and so on. For example, a friend-based social network may store interest information for members (e.g., information about things the members interact with, or "like"), whereas a professional social network may store accomplishment or experience information for members (e.g., educational or work experience information) as well as company profile information, industry information, and so on. Additionally, a social network may store information associated with a member's social graph, such as information identifying other members within the member's social graph, among other things.

In order to facilitate searches for information stored by or accessed by a supported social network, such as searches for information performed by members of the social network, the social network service 130 includes, in some example embodiments, a search assist system 150 that is configured to select and/or present search suggestions proximate to received search queries and based on various selection criteria associated with received search queries, members performing searches, previous or historical search information, and other factors.

The search assist system 150 may include or be part of a search engine 155 that is part of the social network service 130 and facilitates the indexing and searching for content within the social network service 130, such as the indexing and searching for data or information contained by the database 132, 134, 136 and/or 138.

The search engine 155 may collect, parse, and/or store data in an index or other similar structure to facilitate the identification and retrieval of information in response to received queries for information. For example, the search engine 155 may maintain and/or update various different indexes of data to be used by search engine indexing algorithms for information retrieval, such as inverted indexes (e.g., in the form of hash tables or binary trees), N-gram indexes, and so on.

As described herein, in some example embodiments, the social networking service 130 includes and supports a search assist system 150, such as a system that displays or presents search query suggestions along with received search queries and/or receives partial search queries, and/or a system that displays or presents search results based on social network member characteristics, among other things.

Figure 2:
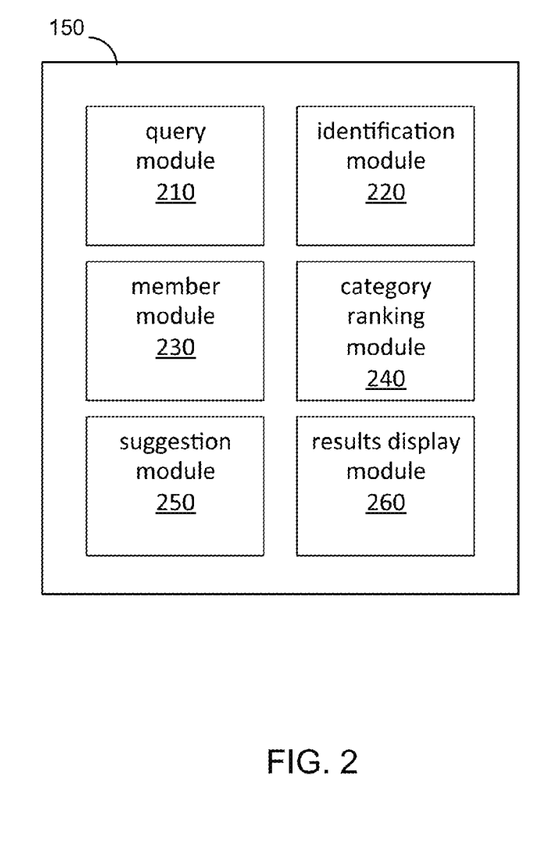
FIG. 2 is a block diagram illustrating modules of a search assist system, consistent with some embodiments.

FIG. 2 is a block diagram illustrating modules of a search assist system 150, consistent with some embodiments. As illustrated in FIG. 2, the application submission system 150 includes a variety of functional modules. One skilled in the art will appreciate that the functional modules are implemented with a combination of software (e.g., executable instructions, or computer code) and hardware (e.g., at least a memory and processor). Accordingly, as used herein, in some embodiments a module is a processor-implemented module and represents a computing device having a processor that is at least temporarily configured and/or programmed by executable instructions stored in memory to perform one or more of the particular functions that are described herein.

Referring to FIG. 2, the search assist system 150 may include a query module 210, an identification module 220, a member module 230, a category ranking module 240, a suggestion module 250, and a results display module 260, among other modules not shown in the Figure.

In some examples embodiments, the query module 210 is configured and/or programmed to receive and/or access a search query, such as a search query received by the search engine 155. The query module 210 may access a full query, such as a member name or company name (e.g., "Apple"), and/or a partial query, such as a string of characters that make up a partially input query (e.g., "A-P-P").

The query module 210 may receive and/or access a variety of different query types, including natural language queries, structure queries, and so on. Also, the query module 210 may receive and/or access queries of varying scopes, such as informational queries, navigational queries, transactional queries, connectivity queries, and so on.

In some example embodiments, the identification module 220 is configured and/or programmed to identify one or more categories of data that include information satisfying the received and/or accessed search query. The identification module 220 may identify, select, and/or determine two or more categories that include and/or contain information that satisfies a received query.

For example, the identification module 220 may parse an index in order to identify categories of data that include information that satisfies a received query. The identification module 220 may determine that two or more categories of data include such information. For example, in response to a search query received by search engine 155, the identification module 220 may identify the member database 132 and the company database 134 both include information that satisfies the received query.

Example categories of information that may include information satisfying a query received by the search assist system 150 include categories of information associated with people or members, categories of information associated with jobs, categories of information associated with companies, categories of information associated with news, categories of information associated with information posted to a social network, categories of information associated with schools and other organizations, categories of information associated with skills or attributes, and so on.

In some example embodiments, the identification module 220 may only identify one category that includes information that satisfies a received query. For example, the identification module 220 may only identify the member database 132 when an accessed query is a specific person's name (e.g., "Patrick Murphy"), or may only identify the company database 134 when the accessed query is a specific company name (e.g., "Nike), among other things.

In some example embodiments, the member module 230 is configured and/or programmed to identify information associated with one or more members of a social network, such as member attribute information. For example, in response to receiving a search query from a member of the social network service 130, the member module 230 may identify and/or determine characteristics, attributes, activity information, social graph information, and other information associated with the member that provided the received search query.

In some example embodiments, the category ranking module 240 is configured and/or programmed to rank the identified, selected, and/or determined categories of data. The category ranking module 240 may rank the categories of data based on a variety of selection criteria, such as selection criteria associated with a popularity of the category and/or the data, criteria associated with a member performing the search for information, criteria associated with other members of a social network service, criteria associated with search engine optimization factors, and so on.

In some example embodiments, the suggestion module 250 is configured and/or programmed to present at least one search query suggestion based on the ranking of the identified categories of data. For example, the suggestion module 250 may present and/or cause to display one or more search query suggestions proximate to a search field within a user interface, such as below or next to an input search query.

For example, the suggestion module 250 may display only one or a few suggestions when the one or few suggestions associated with categories that are highly ranked (e.g., with respect to the other categories) by the category ranking module 240. As another example, the suggestion module 250 may display a blended list of two or more suggestions associated with categories that are similarly ranked to one another by the category ranking module 240.

In some example embodiments, the suggestion module 250 may suggest a query in response to a received partial query (e.g., "app"). The suggestion module 250 may select and/or suggest a query, and present an auto-completion of the suggested query, based on a variety of factors. For example, the suggestion module 250 (or other modules described herein) may determine how frequently people have historically completed the query to the selected query (e.g., Nine times out of ten, when a user types "App" they finish the query with "Apple" and One time out of ten, they finish with "Application Logic"). In such a scenario, the frequently used query is ranked higher for auto-complete purposes.

As another example, the suggestion module 250 may determine a success rate of all queries that potentially match the partial query. For example, if the historical data indicates that the query "Apple" successfully leads users to their desired information (e.g., a desired search result), then the system would rank "Apple" more highly with respect to other search queries for which users do not find their desired information, even if the other search queries are more commonly auto-completed (e.g., even when users tend to select Application Logic more than Apple after typing a partial query of "App").

In some example embodiments, the results display module 260 is configured and/or programmed to present and/or otherwise display the results of a search query based on the identified categories of data. The results display module 260 may present a selected category of data within certain locations or regions of a user interface that is displaying the results of a search for information, such as in locations proximate to a search query field, in highlighted sections, within results that are highly ranked across all members or users, and so on.

Examples of Presenting Search Query Suggestions

Figure 3:
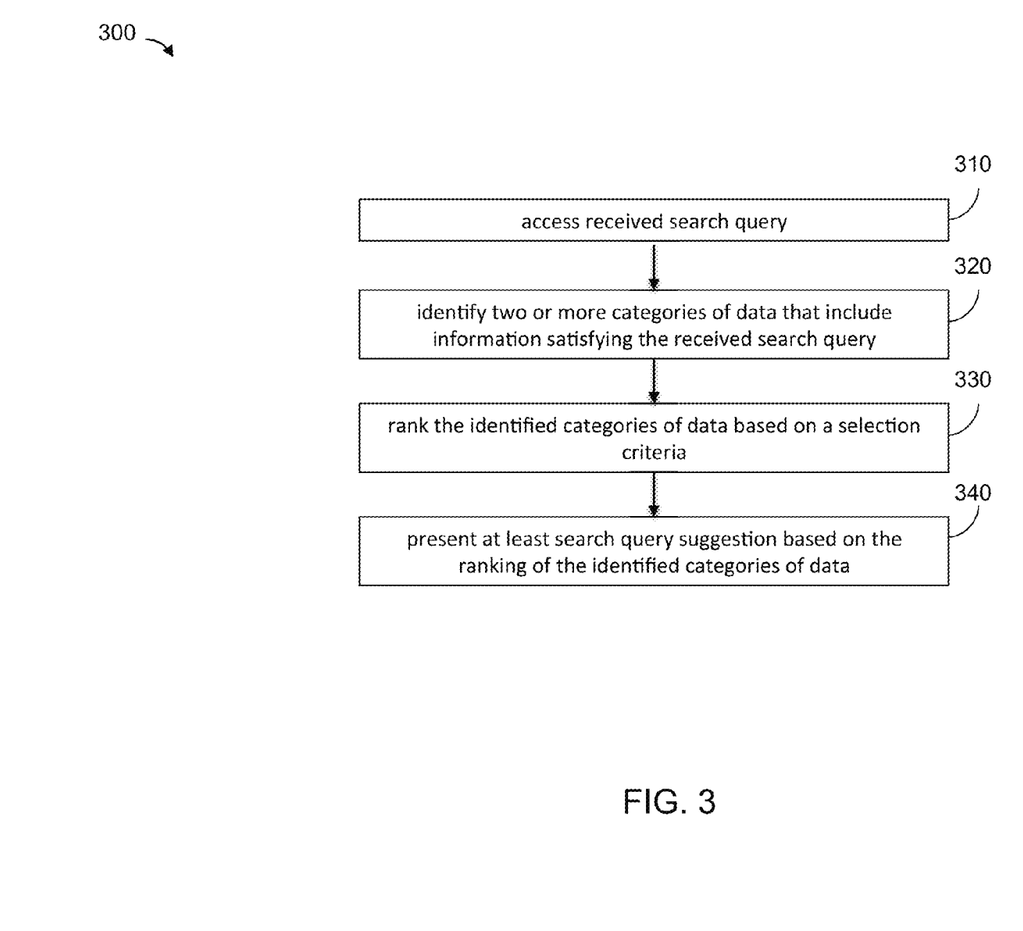
FIG. 3 is a flow diagram illustrating an example method for providing search assistance, consistent with some embodiments.

As described herein, in some example embodiments, the search assist system 150 presents search query suggestions based on the ranking of categories of data stored or accessed by a social network service, among other things. FIG. 3 is a flow diagram illustrating an example method 300 for providing search assistance, consistent with some embodiments.

In operation 310, the search assist system 150 accesses a received search query. For example, the query module 210 accesses a received search query, such as a partial query for information stored by a social network.

In operation 320, the search assist system 150 identifies two or more categories of data that include information satisfying the received search query. For example, the identification module 220 parses one or more indexes of the search engine 155 that received the search query in order to identify categories of data associated with information that satisfies the received search query.

In operation 330, the search assist system 150 ranks the identified two or more categories of data based on a selection criteria. For example, the category ranking module 240 ranks and/or orders the identified categories of data based on selection criteria. Example selection criteria may include:

Criteria associated with a popularity of a category of data and/or a popularity of the information satisfying the received search query;

Criteria associated with a user and/or member that input the received search query, such as criteria associated with member attributes and/or characteristics, criteria associated with activities performed by the member within a social network service, criteria associated with activities performed by other members within the social network service, criteria associated with trending topics or categories, Criteria associated with a quality of results of a search query, such as metrics associated with a previous and/or historical engagement with the results of the search query (e.g., what percentage of users have previously selected a presented search query suggestion and/or what percentage of users have previously selected displayed results associated with the search query);

Combinations thereof; and so on.

In operation 340, the search assist system 150 presents at least one search query suggestion based on the ranking of the identified categories of data. For example, the suggestion module 250 presents, or causes to present, a search query suggestion associated with a top ranked category of data proximate to a search field of a user interface displayed by the social network service 130.

Figure 4:
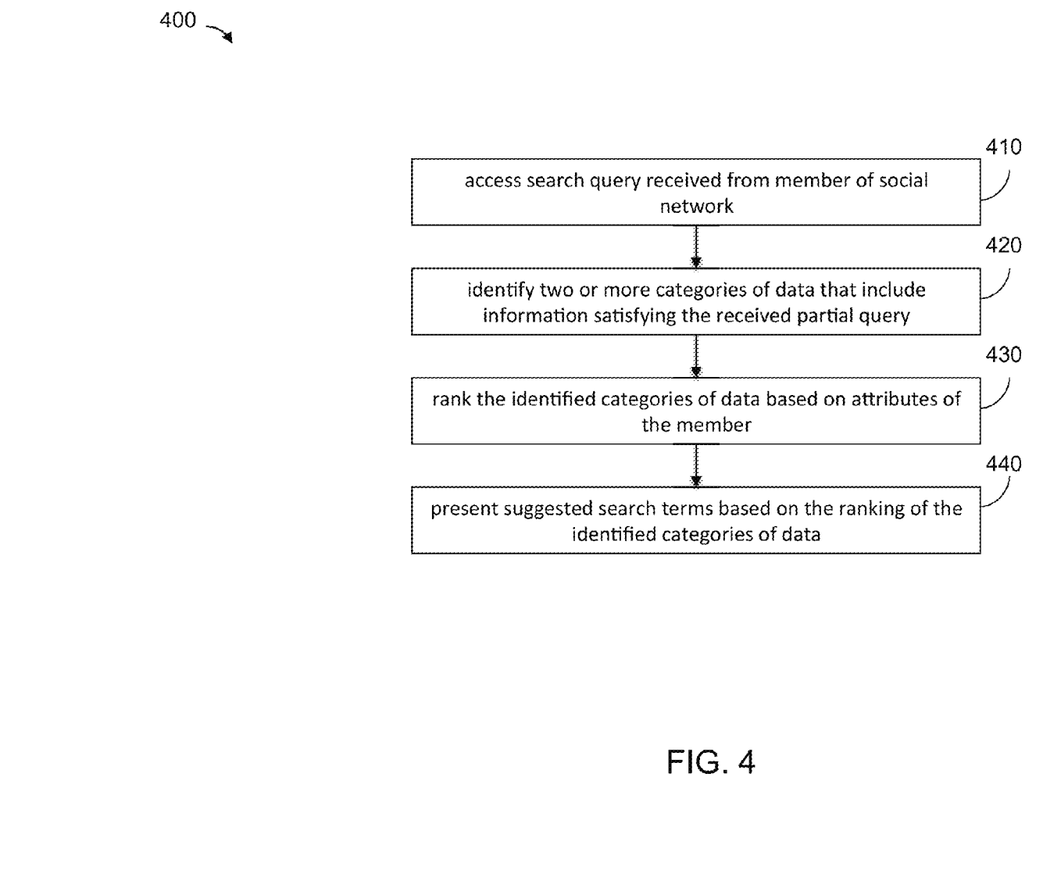
FIG. 4 is a flow diagram illustrating an example method for providing search assistance to a member of a social network, consistent with some embodiments.

As described herein, in some example embodiments, the search assist system 150 may configure and/or select search query suggestions based on the characteristics, the attributes, and/or the activities of a member of a social network that input a search query received by the social network. FIG. 4 is a flow diagram illustrating an example method 400 for providing search assistance to a member of a social network, consistent with some embodiments.

In operation 410, the search assist system 150 accesses a search query received from a member of a social network. For example, the query module 210 accesses a search query received from a member of a social network supported by the social network service 130, such as a professional social network.

In operation 420, the search assist system 150 identifies two or more categories of data within the social network that include information satisfying the received search query. For example, the identification module 220 parses one or more indexes of the search engine 155 that received the search query in order to identify categories of data associated with information that satisfies the received search query.

In operation 430, the search assist system ranks the identified two or more categories of data based on selection criteria associated with the member of the social network. For example, the category ranking module 240 ranks and/or orders the identified categories of data based on selection criteria associated with the member of the social network that input the received search query, such as information provided and/or determined by the member module 230. Example information provided and/or determined by the member module 230 may include:

Member profile information, such as biographical information, education information, work experience information, skills information, awards information, publication information, and so on;

Member activity information that identifies activities of a member or other members within a social network or other associated service, such as activities associated with commenting or viewing blog posts, activities associated with commenting or viewing status updates, activities associated with viewing or applying to job listings, activities associated with performing searches within the social network, activities associated with viewing or selecting results of searches, activities associated with viewing member profiles, activities associated with joining groups and/or associations, and so on; and/or Social graph information, such as information identifying a member's relationships with other members within a social network; and so on.

As an example, the category ranking module 240 may rank a category associated with "jobs" data higher than a category associated with "blogs" data based on information received from the member module 230 that indicates the member that is searching for information within the social network has a recent history of reviewing job posting within the social network, and/or has applied for a job via a job application mechanism provided by the social network, among other things. As another example, the category ranking module 240 may rank the category associated with blogs data higher than the category associated with jobs data based on receiving information from the member module 230 identifying the member as subscribing to a number of information feeds provided by the social network, among other things.

In operation 440, the search assist system 150 presents at least one search query suggestion based on the ranking of the identified categories of data within the social network. For example, the suggestion module 250 presents, or causes to present, a list of search query suggestions proximate to a search field of a user interface that received the search query that includes a first suggestion associated with a higher ranked category of data proximate to the search field and a second suggestion associated with a lower ranked category of data proximate to the first suggestion, among other things.

Figure 5A:
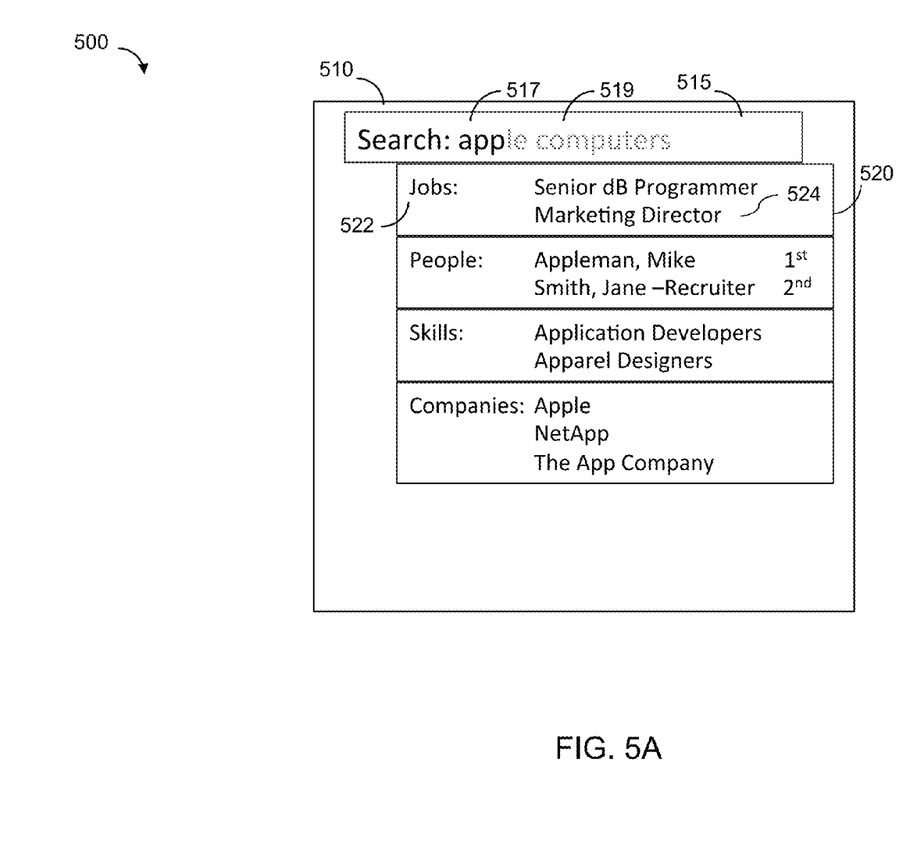
FIG. 5A is a display diagram illustrating an example user interface in which search assistance is provided, consistent with some embodiments.

FIG. 5A is a display diagram 500 illustrating an example user interface 510 in which search assistance is provided, consistent with some embodiments. The example user interface 500 depicts the display or presentation of search query suggestions, such as search query suggestions presented in operation 340 of FIG. 3 or operation 440 of FIG. 4, among other things.

The user interface 510 includes a search field or box 515 that shows a partially input search query of "a-p-p" 517. Based on methods 300 or 400, the user interface 510 presents a blend of different categories of search query suggestions proximate to the received partial query 517, such as a suggestion to complete the query "apple computers" 519 that is located with the search field, as well as multiple search query suggestions 520 proximate to the search field 515 in a list or other ordered display format.

Each of the search query suggestions 520 may include a variety of information, such as information 522 identifying the category of data that includes the search query suggestion 520 and information 524 identifying the specific search query suggestion, such as name information, company information, title information, skill information, social graph or relationship information, and so on.

The user interface 510 depicts the presentation of search query suggestions based on a ranking of categories of data, as described herein. For example, the search assist system 150 may determine that the highest ranked category of data associated with a received query of "a-p-p" is the "jobs" category of data, and displays information from the "jobs" category of data that satisfies the received search query (e.g., "Senior dB Programmer" and "Marketing Director") at the top of the list of search query suggestions 520. The search assist system 150 may determine the next highest ranked category of data is the "people" category of data, and displays information from the "people" category of data that satisfies the received search query (e.g., "Appleman, Mike" and "Smith, Jane—Recruiter") next in the list of search query suggestions 520. Of course, the search assist system 150, via the user interface 510, may display various other types of information in a variety of different formats, among other things.

Figure 5B:
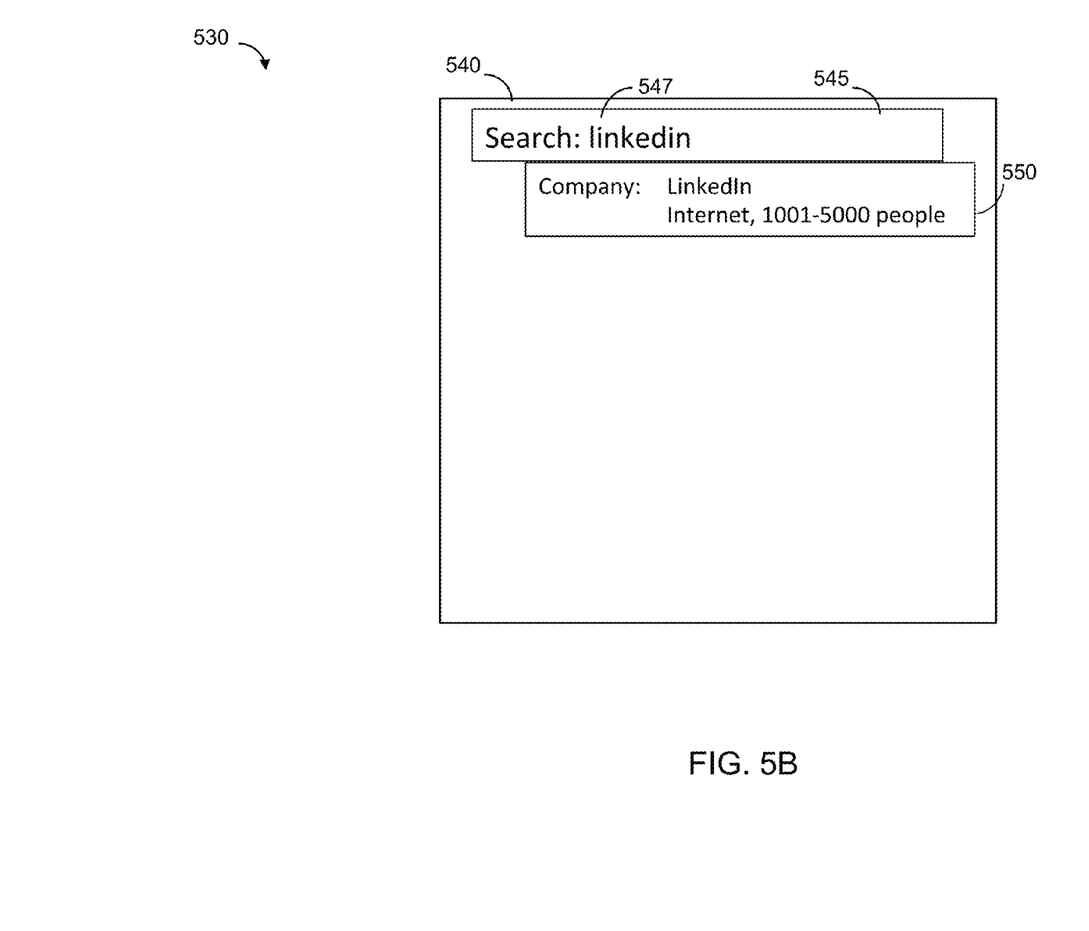
FIG. 5B is a display diagram illustrating an example user interface in which a single search query suggestion is presented, consistent with some embodiments.

FIG. 5B is a display diagram 530 illustrating an example user interface 510 in which a single search query suggestion is presented, consistent with some embodiments. The example user interface 540 depicts the display or presentation of a single search query suggestion, such as one of the search query suggestions presented in operation 340 of FIG. 3 or operation 440 of FIG. 4, among other things.

The user interface 540 includes a search field or box 545 that shows a search query 547 of "linkedin." In response to the search assist system 150, via methods 300 or 400, determining that a single category of information includes information (e.g., the company name of LinkedIn) that is highly ranked with respect to the other categories, the user interface 540 presents a single search suggestion 550 of "LinkedIn" the company.

Thus, in some example embodiments, the search assist system 150 enables a social network or other service that may include or store different categories of data to provide search one or multiple query suggestions to users performing searches within a social network or other category based information service. By presenting search query suggestions, a social network may assist a user, such as a member of the network, in locating new or unknown information, among other benefits.

Examples of Presenting Search Results

Figure 6:
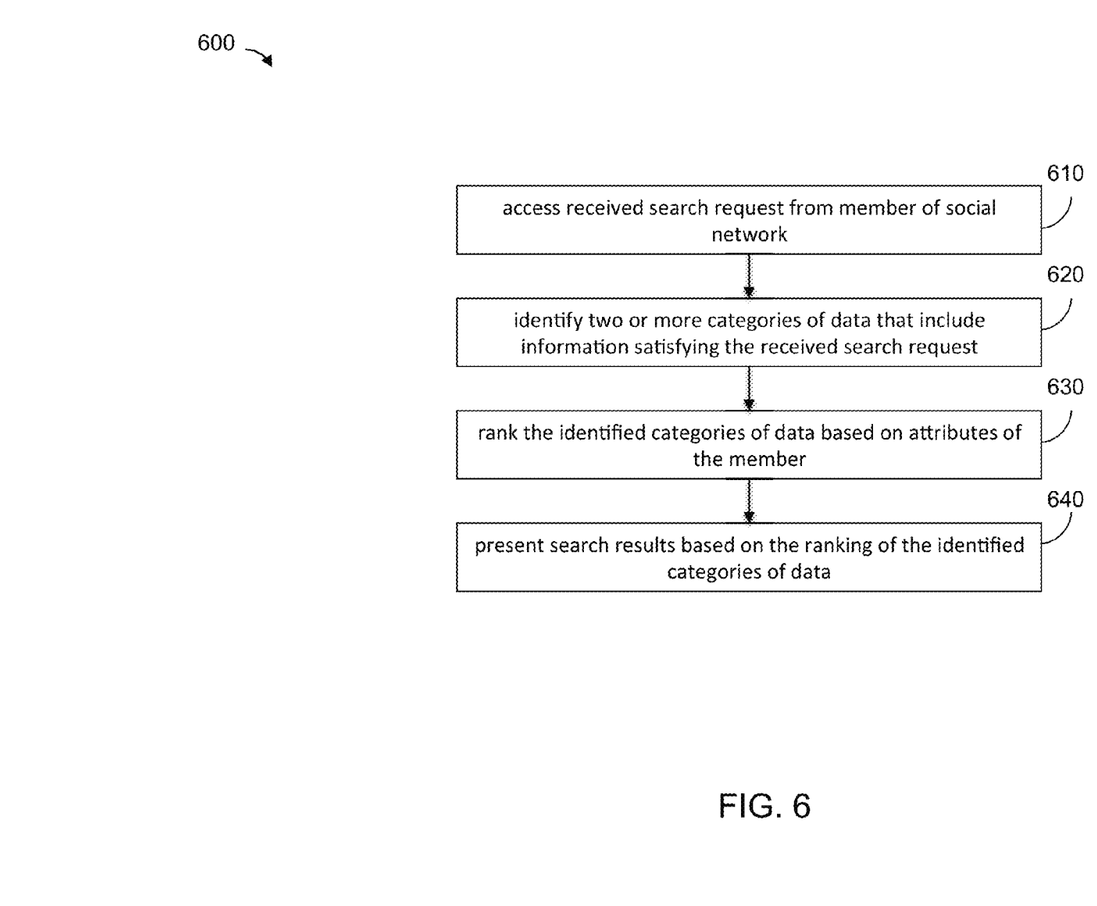
FIG. 6 is a flow diagram illustrating an example method for presenting results of a search to a member of a social network, consistent with some embodiments.

As described herein, in some example embodiments, the search assist system 150 presents results of a search for information based on the rankings of categories of data, among other things. FIG. 6 is a flow diagram illustrating an example method 600 for presenting results of a search to a member of a social network, consistent with some embodiments.

In operation 610, the search assist system 150 accessed a search request received from a member of a social network. For example, the query module 210 accesses a search request received from a member of a social network supported by the social network service 130.

In operation 620, the search assist system 150 identifies two or more categories of data that include information satisfying the received search request. For example, the identification module 220 parses one or more indexes of the search engine 155 that received the search request and identifies multiple categories of data associated with information that satisfies the received search request.

In operation 630, the search assist system 150 ranks the identified two or more categories of data based on selection criteria associated with the member of the social network. For example, as described herein, the category ranking module 240 ranks and/or orders the identified categories of data based on selection criteria associated with the member of the social network that provided the search request, such as attribute, profile, and/or activity information provided and/or determined by the member module 230.

Figure 7:
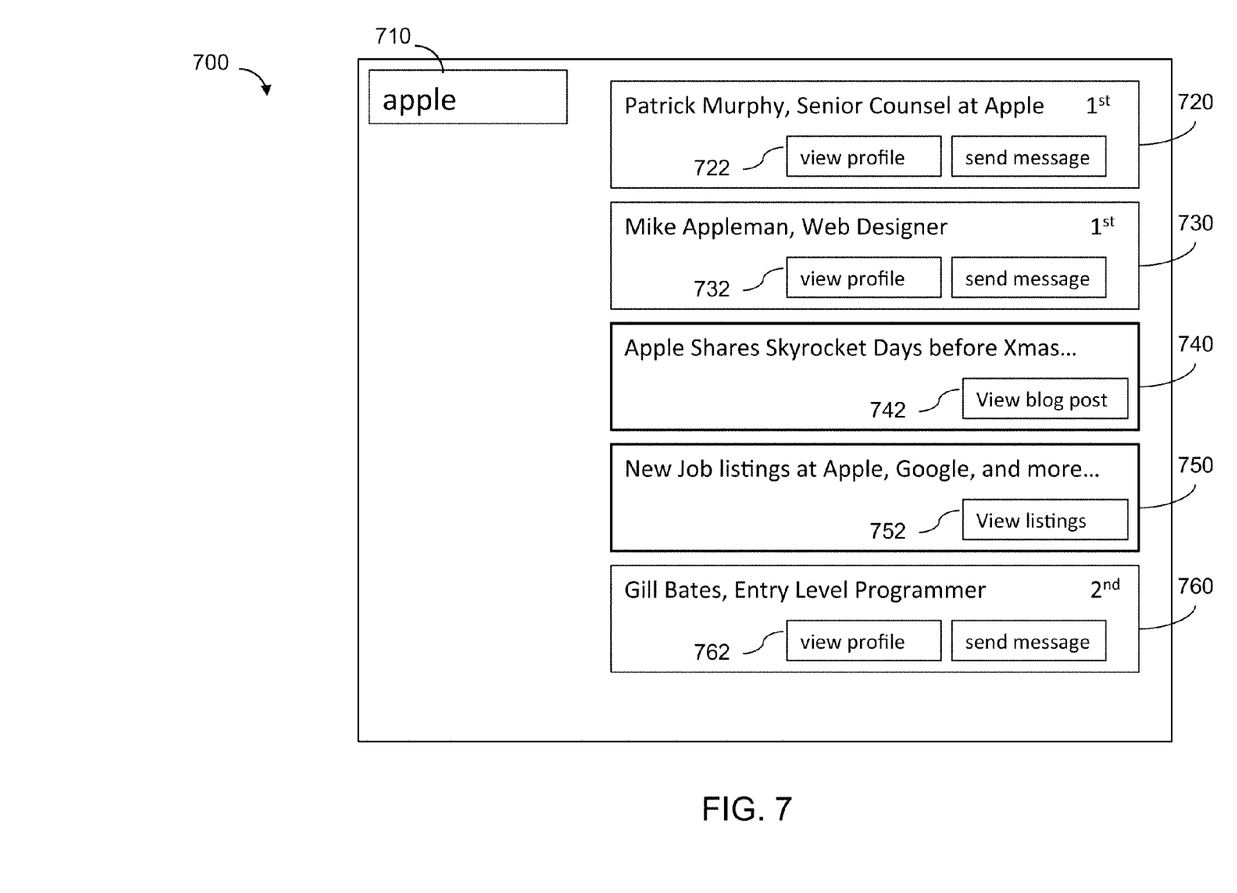
FIG. 7 is a display diagram illustrating an example user interface in which search results are presented, consistent with some embodiments.

In operation 640, the search assist system 150 presents results of the search request based on the ranking of the identified two or more categories of data. For example, the results display module 260 configures a layout of a user interface that displays results of the search based on the ranking of the categories of data. FIG. 7 is a display diagram illustrating an example user interface 700 in which search results are presented, consistent with some embodiments.

The user interface 700 includes a search field 710 that displays the search request (e.g., "apple"), as well as various displayed search results 720-760, presented in a configuration that is based on the ranking of categories of data associated with the search results, as described herein.

For example, in response to receiving a search request of "apple" from a member of a social network, the search assist system 150 may determine that the top three ranked categories of data are the "people" category, the "blogs" category, and the "jobs" category, and configure the user interface 710 to display the results of the search for "apple" based on the determination.

Therefore, the user interface 710 displays the top two results from the "people" category of data, including a first result 720 that includes the name of a member of the social network that works at Apple as well as actionable display buttons 722 that may be used to view the member's profile, send the member a message, and so on, and a second result 730 that includes the name of a member of the social network that includes the letters "apple" and actionable buttons 732. Next, the user interface 710 displays a next result from the "blogs" category, such as a result 740 associated with a blog post that includes the word "apple" within the social network, including title information for the blog post and an actionable display button 742 to view the complete blog post, among other things. The user interface 710 also displays within the list of result from a "jobs" category of data, such as a result 750 associated with a job listing at Apple, including the title of the job listing and an actionable button 752 to view the job listing. The user interface 710 displays another result from the "people" category of data, such as a result 760 of another member of the social network that works at Apple, as well as the associated actionable buttons 762.

Thus, in some example embodiments, the search assist system 150 enables a social network or other service that may include or store different categories of data to present and/or displays search results based on information associated with a member that is searching for information, among other things. Such a presentation of search results may enable the member to find desired information quickly and easily and/or may enable the member to utilize the social network as an effective information retrieval service that is targeted to the needs of the member, among other benefits.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules, engines, objects or devices that operate to perform one or more operations or functions. The modules, engines, objects and devices referred to herein may, in some example embodiments, comprise processor-implemented modules, engines, objects and/or devices.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

Figure 8:
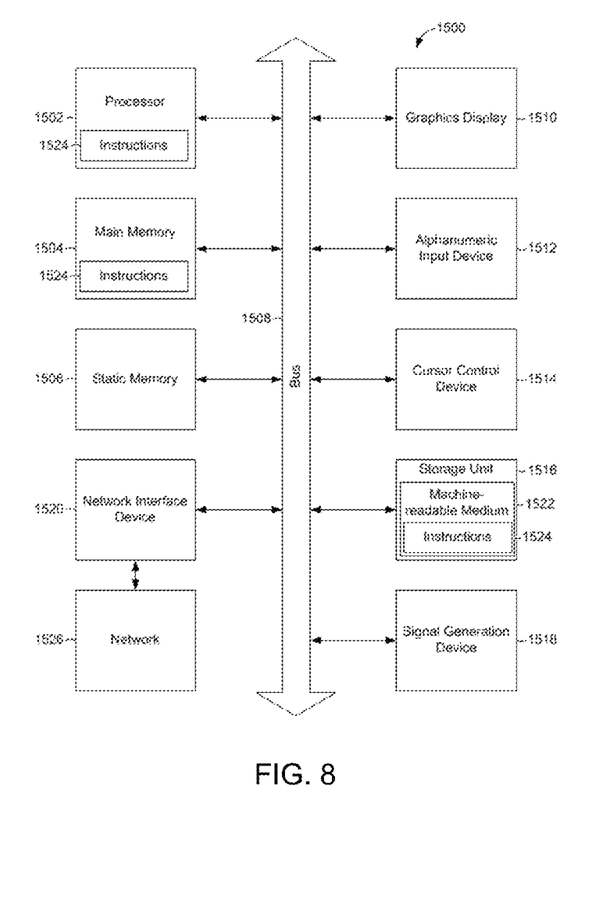
FIG. 8 is a block diagram of a machine in the form of a computing device within which a set of instructions, for causing the machine to perform any one or more of the methodologies discussed herein, may be executed.

FIG. 8 is a block diagram of a machine in the form of a computer system or computing device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment. In some embodiments, the machine will be a desktop computer, or server computer, however, in alternative embodiments, the machine may be a tablet computer, a mobile phone, a personal digital assistant, a personal audio or video player, a global positioning device, a set-top box, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method, comprising:
   receiving a search query from a member of a social network; identifying two or more categories of data within the social network that include information satisfying the received search query;
   ranking the identified two or more categories of data based on a selection criteria associated with the member of the social network and including a quality metric assigned to the information satisfying the received search query within the categories of data, the quality metric including:
      a percentage of users who have previously selected the at least one search query suggestion; and
      a percentage of users who have previously selected displayed results associated with the search query; and
   presenting at least one search query suggestion based on the ranking of the identified categories of data within the social network.

2. The method of claim 1, wherein ranking the identified two or more categories of data based on a selection criteria includes ranking the identified two or more categories of data based on member attributes associated with the member of the social network.

3. The method of claim 1, wherein ranking the identified two or more categories of data based on a selection criteria includes ranking the identified two or more categories of data based on activities performed by the member within the social network.

4. The method of claim 1, wherein ranking the identified two or more categories of data based on a selection criteria includes ranking the identified two or more categories of data based on activities associated with other members of the social network.

5. The method of claim 1, wherein ranking the identified two or more categories of data based on a selection criteria includes ranking the identified two or more categories based on historical user selections of the information within the two or more categories of data.

6. The method of claim 1, wherein ranking the identified two or more categories of data based on a selection criteria includes ranking the identified two or more categories based on a popularity assigned to the categories of data.

7. The method of claim 1, wherein ranking the identified two or more categories of data based on a selection criteria includes ranking the identified two or more categories based on a popularity assigned to the information satisfying the received search query within the categories of data.

8. The method of claim 1, wherein identifying two or more categories of data that include information satisfying the received search query includes querying an index associated with categories of data within a social network for information that satisfies the query.

9. The method of claim 1, wherein identifying two or more categories of data that include information satisfying the received search query includes querying an index associated with information stored by a social network for information that satisfies the query.

10. The method of claim 1, wherein identifying two or more categories of data that include information satisfying the received search query includes a member category of data and a company category of data.

11. The method of claim 1, wherein identifying two or more categories of data that include information satisfying the received search query includes a jobs category of data and a posts category of data.

12. A system, comprising:
a query module to receive a search query from a member of a social network;
an identification module to identify two or more categories of data within the social network that include information satisfying the received search query;
a category ranking module to rank the identified two or more categories of data based on a selection criteria associated with the member of the social network and including a quality metric assigned to the information satisfying the received search query within the categories of data, the quality metric including:
a percentage of users who have previously selected the at least one search query suggestion; and
a percentage of users who have previously selected displayed results associated with the search query; and
a suggestion module to present at least one search query suggestion based on the ranking of the identified categories of data within the social network.

13. The system of claim 12, wherein the suggestion module is to present a list of search query suggestions proximate to a search field of a user interface that received the search query, wherein the presented list includes a first suggestion associated with a higher ranked category of data proximate to the search field and a second suggestion associated with a lower ranked category of data proximate to the first suggestion.

14. The system of claim 12, wherein the suggestion module is to present a list of search query suggestions from a highest ranked category of data proximate to a search field of a user interface that received the search query.

15. The system of claim 12, wherein the query module is to receive a string of characters representing a partial search query within a search field of a user interface that received the search query; and
wherein the suggestion module is to complete the partial search query with a search query suggestion based on information satisfying the received search query from a highest ranked category of data.

16. The system of claim 12, wherein the query module is associated with a social network service that supports a social network; and
wherein the category ranking module is to rank the identified two or more categories of data based on a selection criteria associated with a member of a social network that submitted the search query.

17. The system of claim 12, wherein the query module is associated with a social network service that supports a social network; and
wherein the category ranking module is to rank the identified two or more categories of data based on attributes associated with a member of a social network that submitted the search query.

18. A non-transitory machine-readable medium whose contents, when executed by a computing system, cause the computing system to perform operations, comprising:
receiving a search query from a member of a social network;
identifying two or more categories of data within the social network that include information satisfying the received search query;
ranking the identified two or more categories of data based on a selection criteria associated with the member of the social network and including a quality metric assigned to the information satisfying the received search query within the categories of data, the quality metric including:
a percentage of users who have previously selected the at least one search query suggestion; and
a percentage of users who have previously selected displayed results associated with the search query; and
presenting at least one search query suggestion based on the ranking of the identified categories of data within the social network.

19. The non-transitory machine-readable medium of claim 18, wherein the social network is a professional social network; and
wherein identifying two or more categories of data within the social network that include information satisfying the received search query includes identifying a first category of data that includes member profile information and a second category of data that includes company profile information.

20. The non-transitory machine-readable medium of claim 18, wherein the social network is a professional social network; and
wherein identifying two or more categories of data within the social network that include information satisfying the received search query includes identifying a first category of data that includes job listing information and a second category of data that includes informational post information.

* * * * *